(No Model.) 3 Sheets—Sheet 1.

S. J. ADAMS.
MOLDING APPARATUS.

No. 521,999. Patented June 26, 1894.

(No Model.) 3 Sheets—Sheet 2.

S. J. ADAMS.
MOLDING APPARATUS.

No. 521,999. Patented June 26, 1894.

Witnesses:
J. N. Cooke
F. G. Kay

Inventor
Stephen Janis Adams
By James G. Kay
Attorney (No Model.)  3 Sheets—Sheet 3.

S. J. ADAMS.
MOLDING APPARATUS.

No. 521,999.  Patented June 26, 1894.

Witnesses:  Inventor,
J. N. Cooke  Stephen Janis Adams
F. G. Kay  By James F. Kay
 Attorney

UNITED STATES PATENT OFFICE.

STEPHEN JARVIS ADAMS, OF PITTSBURG, PENNSYLVANIA.

MOLDING APPARATUS.

SPECIFICATION forming part of Letters Patent No. 521,999, dated June 26, 1894.

Application filed July 23, 1891. Serial No. 400,457. (No model.)

*To all whom it may concern:*

Be it known that I, STEPHEN JARVIS ADAMS, a resident of Pittsburg, in the county of Allegheny and State of Pennsylvania, have invented a new and useful Improvement in Molding Apparatus; and I do hereby declare the following to be a full, clear, and exact description thereof.

My invention relates to sand molding apparatus, its object primarily being to provide apparatus for forming within a single flask a large number of small patterns, such as the patterns for pipe welding balls, which have the form of sleeves, the walls of which are either straight or tapering toward the upper end thereof, and to provide for the formation of the cores for such molds out of the same body of sand as the mold is formed and the support of such cores during the handling of the mold and during the withdrawal of the patterns therefrom.

To these ends my invention comprises, generally stated, a sand molding apparatus, in which a hollow or tubular pattern is employed; a molding table forming the base for the opening in the tubular pattern during the compacting of the sand; a dropping or withdrawing apparatus having a core supporting post, which will close the base of such hollow or tubular pattern and support the core formed within the same during the withdrawal of the pattern; and a suitable supporting frame and supporting wires to sustain the cores formed within the tubular patterns while the mold is being transferred to the dropping table or to the drag or sand bed. The particular points of invention to be covered will be hereinafter more particularly set forth and claimed.

To enable others skilled in the art to make and use my invention, I will describe the same more fully, referring to the accompanying drawings, in which—

Figure 4:
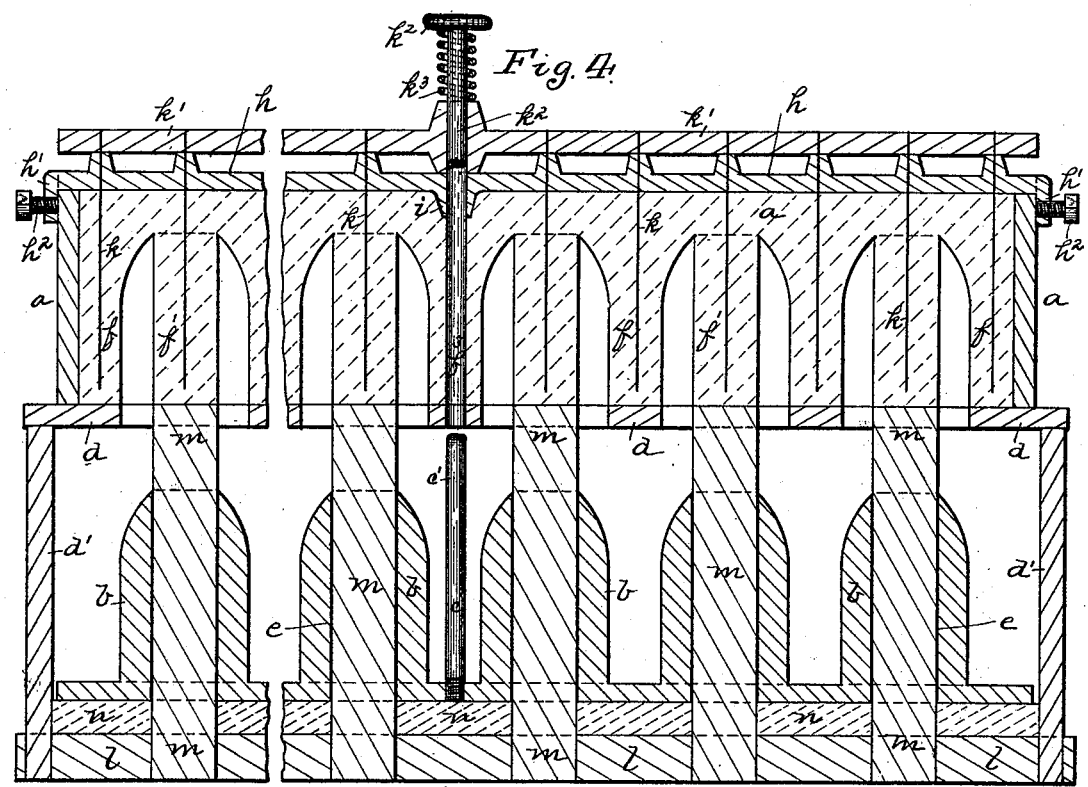
Figure 1:
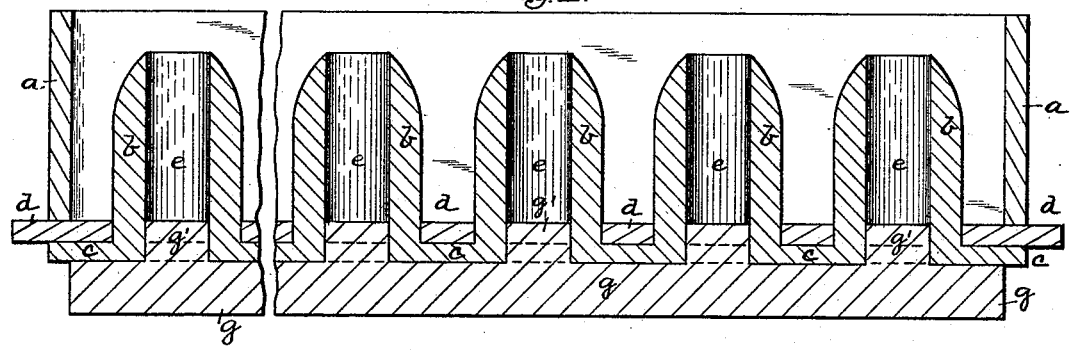
Figure 5:
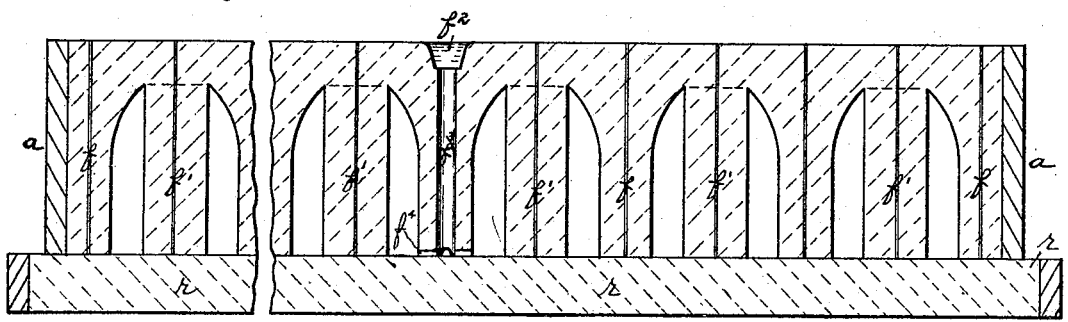
Figures 2, 3:
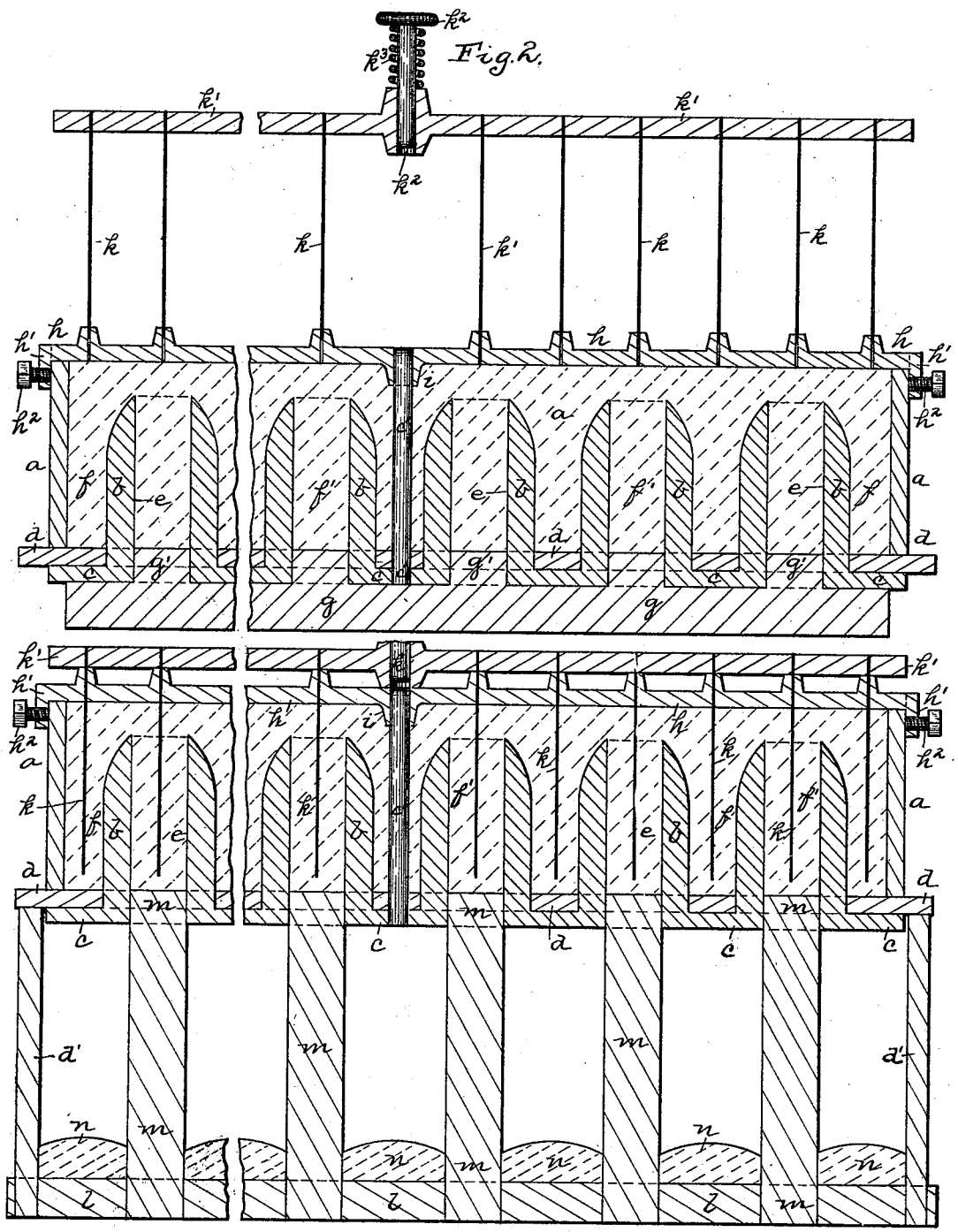
Figure 6:
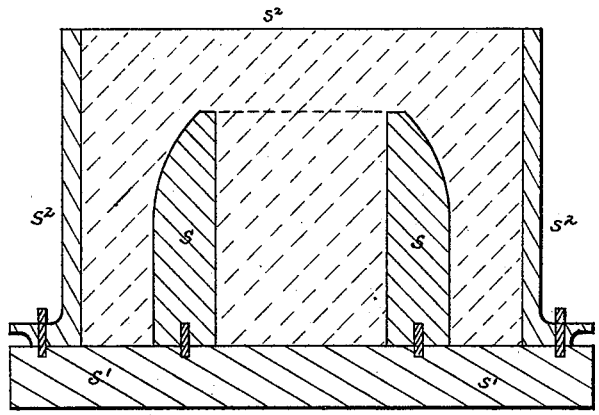
Figure 7:
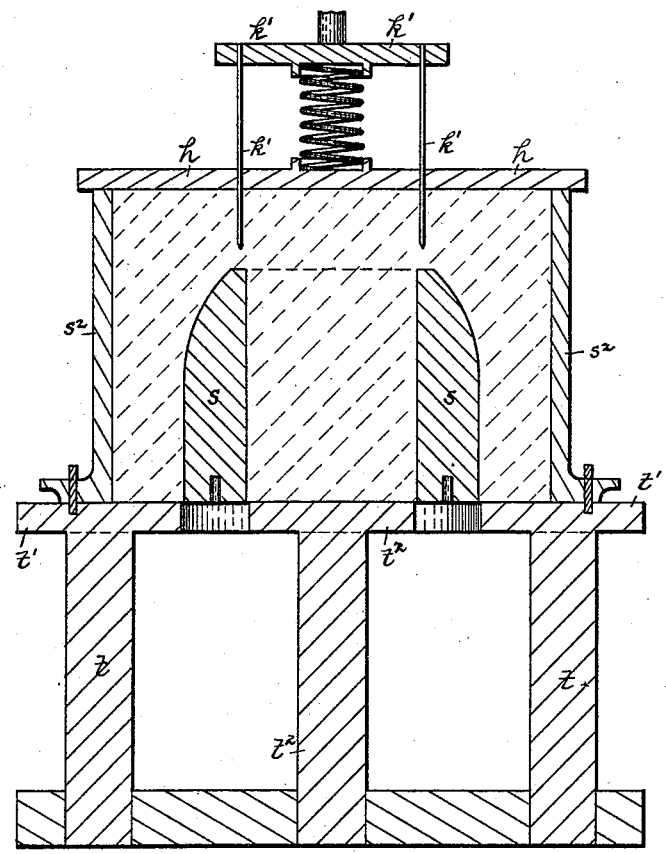

Figure 1 is a sectional view of a mold resting on the molding table. Fig. 2 shows the same mold with the supporting wires inserted, so as to provide for the transferring of the same to the dropping table and after the patterns are withdrawn, to sustain the cores when being placed upon the drag. Fig. 3 is a like view showing the apparatus in position for the withdrawal of the pattern. Fig. 4 is a like view showing the patterns withdrawn. Fig. 5 is a view of the finished mold; and Figs. 6 and 7 are views of a simpler form of apparatus embodying the invention.

Like letters of reference indicate like parts in each of the views.

I have illustrated my invention in connection with a number of patterns entering within a single flask, and so providing for the formation of a large number of molds within the same, for the reason that my invention is especially applicable to the formation of small castings, such as small pipe welding balls, having the form of sleeves to be slipped over a mandrel. I will therefore describe my invention in connection with such mold, though it is to be understood that it may also be employed in the formation of single molds within a single flask.

The flask $a$ has extending up within the same, a series of tubular patterns $b$, these patterns being preferably secured to the pattern plate $c$, and preferably extending up through a stripping plate $d$, the bases of the patterns fitting neatly within the same. Extending through each pattern is the tubular passage $e$ within which the sand is packed to form the core $f'$ as illustrated in Fig. 5, and the molding table $g$ closes the bases of such passages $e$. Where the pattern plate or stripping plate (both or either) are employed, I form on the table $g$ a series of blocks or upward extensions $g'$ which enter the bases of the hollow patterns and so close the same, forming closed bases to the passages $e$, within which the sand is packed. It will be noticed that blocks $g'$ illustrated extend up to a height corresponding to the top edge of the stripping plate $d$, so that the sand packed within the flask may have a level or even base resting upon the drag or sand bed, as shown in Fig. 5. The sand is packed within the flask $a$ in any suitable way, and so forms a mold such as shown in Fig. 5, having the mold walls $f$ and the cores $f'$ which depend therefrom, the lower edge of the mold being even or level and being so formed by the top edge of the stripping plate $d$, and the top faces of the blocks $g'$, where the same are employed.

In order to support the mold within the flask and insure the sustaining of the cores when the flask and patterns are lifted from the molding table and placed upon the dropping table, I provide the apparatus illustrated in Figs. 2, 3 and 4, consisting in a guide frame $h$, which can be properly centered upon the flask $a$ by lips or lugs $h'$, and may be secured thereto by a set screw $h^2$, if the same be necessary. The guide frame may also be centered by means of what I term a sprue former $i$, which extends down from the guide frame and fits around the gate pattern $c'$ extending up from the pattern plate $c$ and fitting in a vertical passage formed through the frame $h$ within said sprue former $i$. The gate pattern preferably extends slightly above the flask so that when its upper edge is leveled off, the gate pattern will act as a guide for the frame $h$ when placed upon the flask, and as said frame is pressed down, the sprue former $i$ will be forced into the sand and so form the sprue or enlargement $f^2$ at the upper end of the gate $f^3$ of the finished mold. The runners $f^4$ extend from the gate $f^3$ into the mold cavities.

Extending through the guide frame $h$, are a series of passages through which the vertical supporting wires $k$ pass, these wires being preferably secured to the frame $k'$, so that they may all be forced down to place at one time, the wires $k$ entering within the core $f'$ and also within the body of the mold $f$ at any suitable point at which it is desired to give support to the same, and said wires being properly braced by their connection with the wire frame $k'$, and by the guide frame $h$, which is firmly secured to the flask.

The wire frame $k'$ has preferably a hammer or pattern starter $k^2$ mounted therein, which is formed of the vertically reciprocating bar adapted to strike or press upon the upper end of the gate pattern $c'$, and by imparting an initial movement to the same, cause the movement of the pattern plate with all its patterns. Such pattern starter $k^2$ is withdrawn by a spring $k^3$ pressing upon the upper part of the wire frame $k'$ and a pin on the bar. Such pattern starter may act upon the gate, or on the pattern or on one or more wires extending up from the pattern plate. As so arranged the flask is ready to be lifted from the molding table and placed upon the dropping table, which has the following construction: Extending up from the bed plate $l$ are the posts or standards $d'$, and which are adapted to engage with the stripping plate $d$ where it extends beyond the pattern plate $c$ and support the same, or to engage directly with the flask. Extending up from the same bed plate $l$ are a series of core supporting bars $m$, which correspond substantially to the interior diameter of the tubular patterns $b$, and are adapted to close the bases thereof, contacting with the bases of the cores formed within the patterns. Where the cores do not extend down to the bases of the tubular passages, these bars $m$ enter within the same and extend up to the cores, being for example on a line on the same plane with the upper face of the stripping plate $d$, so as to give support to the bases of the cores $f'$ formed within the tubular passages $e$ of said patterns $b$. The several core supporting bars $m$ in this way register with the hollow patterns, so that when the flask with its stripping plate is carried to and placed upon the dropping apparatus the core supporting bars $m$ will enter within the bases of the patterns, and the stripping plate will rest upon the stripping plate bars $d'$, the apparatus in this position being ready for dropping or withdrawing the patterns. I prefer to place upon the bed plate $l$ any suitable form of cushions as at $n$, by means of which the patterns or pattern plate may be cushioned in its descent, so preventing jarring thereto and to the mold frame. The cushions shown are intended to represent rubber or like cushioning material around the core supporting bars.

When the apparatus is thus arranged, it is ready for the dropping operation, the several patterns will naturally be held within the mold formed by the adherence or binding of the sand upon the walls thereof, and it will be necessary to impart at least an initial movement to the patterns to cause their withdrawal, and for this purpose the reciprocating presser or pattern starter $k^2$ above referred to is employed.

In forming molds in accordance with my invention with the apparatus above described, the stripping plate $d$ is placed over the pattern plate $c$, the patterns $b$ extending through the same and the two plates are placed over the molding table $g$, the blocks or extensions $g'$ registering with the several hollow patterns and extending up into the bases of the passages $e$ thereof. The flask $a$ is then placed upon the stripping plate $d$, and the apparatus is ready for the molding operation. Sand is then fed to the flask and compacted therein in any suitable way, and as soon as the molds are completed, the operator takes the frame $h$ and places it over the finished mold, guiding it to place in any suitable way, but it being preferred that he pass the sprue former $i$ over the gate pattern $c'$ and force the same down so as to form the sprue $i'$, and he then clamps the frame upon the flask by means of the set screw $h^2$, if this be necessary. It is preferred that the two frames $h$ and $k$, that is, the guide frame and the wire frame, be also held together, and after this is done it is only necessary to force the wires down into the sand of the mold, the guide frame acting as a guide for the wires, and insuring the wires entering the several cores formed within the tubular patterns and within the body of the mold, where it is necessary to give support thereto. As soon as this is done, the flask with its pattern and stripping plates are lifted from the molding table and carried to the dropping apparatus and placed thereon, so that the core supporting bars $m$ enter within the hollow passages $e$ of the patterns $b$, and the stripping plate $d$ rests upon the standard $d'$, when the apparatus is ready for the dropping of the patterns. The operator then, by means of the pattern starter $k^2$, presses upon the upper end of the gate pattern $c'$, which overcomes the adherence of the pattern body to the faces of the molds and the cores formed within the sand, and when this adherence between the patterns and molds is overcome, the patterns are free to drop out of the molds, as illustrated in Fig. 4. When the patterns drop out of the mold, the sand forming the body of the mold between the mold cavities is supported by the stripping plate $d$, and the sand of each core is supported by its core supporting bar $m$ upon which it rests, while the different parts of the mold are further supported by the wires entering therein, and braced by the frames $h$ and $k'$ above referred to. As a result of such support to the different parts of the mold, it is evident that the patterns will be withdrawn without in any way affecting the sand compacted within the flask, which is entirely and properly supported during the withdrawing action. As soon as the patterns are thus withdrawn, the operator simply lifts the mold from the stripping plate and carries it over and places it upon the sand bed or drag $r$, it being understood that the passages or runners from the gate $f^2$ may either be formed in the base of the mold by ribs on the upper face of the stripping plate or may be formed in the drag or sand bed $r$, so as to feed the metal from such pouring gate $f^2$ to all of the molds within the flask. As soon as the flask is placed upon the sand bed, as there is no further need of support to the cores, which then rest upon the sand bed and are not moved until after the casting of the metal, the operator draws up the wire frame $k'$ so withdrawing the supporting wires, loosens the guide frame $h$, and proceeds in the same manner to form another mold.

In Figs. 6 and 7 my invention is illustrated in its more simple form, in which the above pattern plate and the stripping plate are done away with. In that case the pattern $s$ rests directly upon the molding table $s'$, being guided to position thereon by suitable pins, and the flask $s^2$ rests also on the molding table and is guided to proper position by like means. After the compacting of the sand within and around the tubular patterns, the supporting frames substantially the same as the skeleton frames $h$ and $k$ above referred to are placed in position, the supporting wires passed down into the mold, and the flask carried to the dropping table. The adherence of the sand to the patterns will usually be sufficient to retain them in place during the transferring of the patterns to the dropping table. The dropping table is formed with standards $t$ which support a stripping plate or table $t'$ having an opening therein corresponding to the pattern, while the supporting post $t^2$ corresponds to the tubular passage in the pattern, and when the flask with its mold is placed upon the dropping table the body of the sand within the flask is supported by the stripping plate or table $t'$, while the core formed within the tubular pattern is supported by the bar $t^2$, which contacts with such core without however entering into the pattern itself. In this way all of the sand within the mold is supported, and by any suitable means initial pressure is applied to the pattern, such for example as by bars forced down into the sand to press against the upper edges thereof, as shown in Fig. 7, or by such pressing apparatus operating on plates or bars extending up from the pattern to the upper edge of the flask. As the pattern drops from the mold the core is supported by the bar $t^2$ and the body of the mold is supported by the plate or table $t'$, practically the same results as above described being obtained. In like manner simply a stripping plate may be employed, the pattern being loose, and the invention may be varied in different ways, which are of course included herein.

By such apparatus I am enabled to form this class of molds without the employment of any separate cores, and at the same time am enabled to form the cores quickly, to support the cores properly, and to provide for the withdrawal of the patterns without fear of injury to the body of the mold.

It will be understood that my invention may applied to the formation of other shapes of hollow castings, and that if desired, wings or like devices may be formed on the interior of the castings, the core supporting bars of the dropping apparatus being correspondingly formed.

What I claim as my invention, and desire to secure by Letters Patent, is—

1. In sand molding apparatus, the combination of a molding table having a series of blocks or upward extensions thereon, a portable pattern plate resting on said table and carrying a series of tubular patterns having vertical inner walls, the blocks of the table corresponding in section to and fitting within the tubular patterns, a portable stripping-plate fitting around the patterns and resting on the pattern plate, and a flask resting on the stripping-plate, substantially as and for the purposes set forth.

2. In sand molding apparatus, the combition with a pattern and a flask, of a guide frame extending over the same, and a supporting wire adapted to pass through the frame into the sand and support the mold formed, substantially as and for the purposes set forth.

3. In sand molding apparatus, the combination of a tubular pattern, a flask, and a frame extending over the flask, and having a wire to enter the core formed within the tubular pattern and support the same, substantially as and for the purposes set forth.

4. In sand molding apparatus, the combination with a flask and a series of tubular patterns, of a guide frame extending over the flask and a frame having a series of supporting wires adapted to enter through the frame and support the body of the mold and cores formed in the tubular patterns, substantially as and for the purposes set forth.

5. In sand molding apparatus, the combination of a pattern, a bar extending up from the pattern or its plate to the top of the mold, and a frame supported on the mold and carrying a presser adapted to contact with the bar to give the initial dropping movement to the pattern, substantially as and for the purposes set forth.

6. In sand molding apparatus, the combination of a flask, a pattern extending up into the same, a frame supported on the mold, and a vertically reciprocating presser or pattern starter mounted in said frame and adapted to impart the initial dropping motion to the pattern, substantially as and for the purposes set forth.

7. In sand molding apparatus, the combination with a portable pattern plate carrying a series of hollow patterns, a portable stripping-plate fitting around the same and a flask supported on the stripping-plate, of a molding table having a series of blocks extending up within the hollow patterns and forming the bases thereof during the molding operation, and a separate pattern removing apparatus having supporting bars extending up and registering with the hollow bases of the patterns to support the sand therein, and a series of standards supporting the stripping-plates, so giving support to the mold when the patterns are withdrawn, substantially as and for the purposes set forth.

8. In sand molding apparatus, the combination with a portable pattern plate carrying a series of tubular patterns, a portable stripping-plate around the same, and a flask, of a dropping apparatus having core supporting bars extending up within the hollow bases of the patterns and supporting the sand therein, and having a series of standards supporting the stripping-plate, said core supporting bars and standards being arranged at such height as to support the body of the mold and the cores within the hollow patterns at the proper level when the patterns are withdrawn, substantially as and for the purposes set forth.

In testimony whereof I, the said STEPHEN JARVIS ADAMS, have hereunto set my hand.

STEPHEN JARVIS ADAMS.

Witnesses:
JAMES I. KAY,
J. N. COOKE.